(12) United States Patent
Seethaler et al.

(10) Patent No.: US 8,777,244 B2
(45) Date of Patent: Jul. 15, 2014

(54) SINGLE-PIVOT TYPE SUSPENSION STRUT AXLE

(71) Applicant: Bayerische Motoren Werke Aktiengesellschaft, Munich (DE)

(72) Inventors: Ludwig Seethaler, Hebertshausen (DE); Roland Schmidt, Stockdorf (DE); Michael Glanzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/724,922

(22) Filed: Dec. 21, 2012

(65) Prior Publication Data

US 2013/0113177 A1    May 9, 2013

Related U.S. Application Data

(63) Continuation of application No. PCT/EP2011/059027, filed on Jun. 1, 2011.

(30) Foreign Application Priority Data

Jul. 7, 2010 (DE) .......................... 10 2010 031 054

(51) Int. Cl.
  *B60G 3/10* (2006.01)
(52) U.S. Cl.
  USPC ............................... 280/124.145; 280/124.17
(58) Field of Classification Search
  USPC .................... 280/124.124, 124.145, 124.147, 280/124.163, 124.17, 124.174
  See application file for complete search history.

(56) References Cited

U.S. PATENT DOCUMENTS

| | | | |
|---|---|---|---|
| 2,164,838 A * | 7/1939 | Porsche | ......................... 267/284 |
| 3,492,018 A | 1/1970 | Burckhardt et al. | |
| 4,105,222 A * | 8/1978 | Buchwald | .............. 280/124.104 |
| 4,526,249 A | 7/1985 | Parker | |

(Continued)

FOREIGN PATENT DOCUMENTS

| | | |
|---|---|---|
| DE | 1 555 234 | 2/1971 |
| DE | 29 27 486 A1 | 1/1981 |
| DE | 30 12 873 A1 | 10/1981 |
| DE | 35 39 054 A1 | 5/1987 |

(Continued)

OTHER PUBLICATIONS

International Search Report dated Jul. 4, 2011 including English-language translation (Six (6) pages).

(Continued)

*Primary Examiner* — Paul N Dickson
*Assistant Examiner* — Timothy Wilhelm
(74) *Attorney, Agent, or Firm* — Crowell & Moring LLP

(57) ABSTRACT

A single-pivot suspension strut axle for a passenger car, includes a wheel carrier/pivot bearing carrying the wheel and a brake disk non-rotatably connected with the wheel relative to a rotational axis thereof. A suspension strut is fastened to the wheel carrier/pivot bearing and, at another end, is supported at the vehicle body. The wheel carrier/pivot bearing is guided by a supporting joint situated close to the wheel center plane by a lower control arm, representing an A-arm, and by a tie rod. A section of the control arm connected with the supporting joint projects through the ring-shaped brake disk. A leaf spring element oriented in the transverse direction of the vehicle provides proportional support for the vehicle body on the wheel, and is supported, on one side, at the control arm and, on another side, directly or indirectly, at the vehicle body.

16 Claims, 4 Drawing Sheets

(56) References Cited

U.S. PATENT DOCUMENTS

| | | | |
|---|---|---|---|
| 4,982,978 A * | 1/1991 | Kawasaki | 280/124.109 |
| 6,029,987 A * | 2/2000 | Hoffman et al. | 280/124.171 |
| 6,357,769 B1 * | 3/2002 | Omundson et al. | 280/124.109 |
| 6,530,587 B2 * | 3/2003 | Lawson et al. | 280/124.17 |
| 7,441,788 B2 * | 10/2008 | Leclair | 280/93.512 |
| 7,490,840 B2 * | 2/2009 | Luttinen et al. | 280/93.512 |
| 7,712,753 B2 * | 5/2010 | McCann | 280/93.511 |
| 2005/0056497 A1 | 3/2005 | Idei et al. | |
| 2006/0006623 A1 | 1/2006 | Leclair | |
| 2007/0144839 A1 | 6/2007 | Seksaria et al. | |
| 2011/0084503 A1 * | 4/2011 | Li et al. | 290/1 R |

FOREIGN PATENT DOCUMENTS

| | | |
|---|---|---|
| DE | 39 31 868 A1 | 4/1991 |
| DE | 197 21 878 A1 | 12/1998 |
| DE | 10 2009 014 879 A1 | 9/2010 |
| EP | 0 402 777 A1 | 12/1990 |
| EP | 0 488 376 A1 | 6/1992 |
| EP | 0 402 777 B1 | 2/1994 |
| FR | 2 700 591 A1 | 7/1994 |

OTHER PUBLICATIONS

German Search Report dated Jun. 6, 2011 including partial English-language translation (Ten (10) pages).

* cited by examiner

SINGLE-PIVOT TYPE SUSPENSION STRUT AXLE

CROSS-REFERENCE TO RELATED APPLICATIONS

This application is a continuation of PCT International Application No. PCT/EP2011/059027, filed Jun. 1, 2011, which claims priority under 35 U.S.C. §119 from German Patent Application No. DE 10 2010 031 054.9, filed Jul. 7, 2010, the entire disclosures of which are herein expressly incorporated by reference.

BACKGROUND AND SUMMARY OF THE INVENTION

The invention relates to a single-pivot type suspension strut axle for a motor vehicle, particularly for a passenger car, having a wheel carrier or pivot bearing carrying the wheel and a brake disk non-rotatably connected with the wheel with respect to the axis of rotation of the wheel, to which wheel carrier or pivot bearing the suspension strut is fastened. The suspension unit, with its other end, is supported at the vehicle body, and is further guided by way of a supporting joint situated close to the wheel center plane by a lower control arm functionally representing an A-arm and is furthermore guided by a tie rod. Concerning the technical background, reference is made particularly to German Patent Document DE 30 12 873 A1, as well as to German Patent Document DE 197 21 878 A1, to German Patent Document DE 29 27 486 A and to German Patent Application 10 2009 014 879.5, which is not a prior publication.

High demands with respect to driving dynamics and driving comfort are made on the axle constructions of higher-value vehicles. A spring strut type axle or a twin control arm axle is therefore usually selected for driven front axles, which, however, both have system-related disadvantages. Thus, a spring strut type axle has a relatively large overall height, while the construction expenditures for twin control arm axles are relatively high.

The so-called suspension strut axles of the so-called single-pivot type may be more advantageous here, in which case, however, demands, that are difficult to implement constructively, are made on the position of the so-called supporting joint, in which a control arm (in the following called "control arm") situated at the bottom is connected with the so-called pivot bearing (if a front axle with steerable wheels is involved) or the so-called wheel carrier (if a rear axle is involved). Specifically, as correctly indicated and substantiated in the initially first-mentioned German Patent Document DE 30 12 873 A1, this supporting joint called a "wheel joint" should be situated there as low as possible at least almost in the wheel center plane. In that document, a horizontal distance between the supporting joint and the wheel center plane of only 20 mm measured in the transverse direction of the vehicle is mentioned as an example.

However, such a narrow horizontal distance measured in the transverse direction of the vehicle between the supporting joint and the wheel center plane, which under all types of stress causes only a slight interfering bending moment upon the suspension strut, can in reality hardly be achieved constructively by way of the conventionally designed known wheel suspensions or axle constructions.

Therefore, a suspension strut axle needed where the supporting joint can be arranged in a constructively well implementable manner in close proximity to the wheel center plane, in which case it should be explicitly pointed out that this "close proximity", i.e. the horizontal distance measured in the transverse direction of the vehicle does not have to be equal to the 20 mm indicated in the above-mentioned document, but can definitely also be in the range of between 0 mm and 40 mm.

For achieving this and other objects, a single-pivot type suspension strut axle for a motor vehicle is provided, particularly for a passenger car, having a wheel carrier or pivot bearing carrying the wheel and a brake disk non-rotatably connected with the wheel with respect to the axis of rotation of the wheel, to which wheel carrier or pivot bearing the suspension strut is fastened which, with its other end, is supported at the vehicle body, and which is further guided by way of a supporting joint situated close to the wheel center plane by a lower control arm functionally representing an A-arm and is furthermore guided by a tie rod. The brake disk is constructed as a ring, through which the control arm projects by way of its section connected with the supporting joint.

According to the invention, deviating from the construction having a so-called brake disk chamber customary in the case of passenger cars, the brake disk is constructed without such a brake disk chamber and therefore represents a ring—as in the construction known from motorcycles—, which ring is constructed in a suitable manner with the wheel in its exterior edge area. A caliper, which carries the brake pads and, if required, presses the latter against the brake disk, in the process reaches around the brake disk from the interior, i.e. from the direction of its radially inner ring edge area. A corresponding exemplary construction of such a wheel assembly of a motor vehicle is illustrated in the above-mentioned German Patent Application 10 2009 014 879.5, which is not a prior application.

As a result of the fact that, according to the invention, the above-mentioned supporting joint, viewed in the transverse direction of the vehicle from the center plane of the vehicle, is situated outside the brake disk, the supporting joint can be arranged very close to the wheel center plane because the brake disk or its (in the present case, absent) chamber does not have to be taken into account. In this case, an arrangement of the brake disk that is quasi-inside such a supporting joint of a wheel carrier, i.e. between the supporting joint and the vehicle center plane, is already known—compare, for example, German Patent Document DE 15 55 234 A or European Patent Document EP 0 402 777 B. However, this state of the art does not concern a single-pivot suspension strut axle, and, in particular, no control arm extends through the brake disk, but in the prior art, control arms extend around this brake disk on the exterior side, i.e. along its exterior edge.

The above-mentioned actual requirement, specifically, the indication of an axle for a passenger car that requires as little space as possible and, in particular, has a low overall height, can be met even better by way of a suspension strut axle according to the invention if a leaf spring element oriented at least partially in the transverse direction of the vehicle is provided as a supporting spring for the proportional support of the vehicle body on the wheel. The leaf spring element is supported on the one side at the above-mentioned control arm and, on the other side, directly or indirectly by the interposition of an axle support at the vehicle body. In this case, the use of a leaf spring as a supporting spring for a suspension strut axle is basically known; compare, for example, the above-mentioned German Patent Document DE 197 21 878 A1.

It is further provided here that no wheel guiding function be assigned to the leaf spring element, also called a "transverse leaf spring", so that this transverse leaf spring can be dimensioned as a pure bending beam with a parabolic cross-sectional course. In this sense, the leaf spring element is preferably hinged to the control arm and is fixedly, with respect to moments, supported with its other end (at the vehicle body or at an axle support). Particularly for reducing weight, the leaf spring element may be constructed of a plastic material, particularly of a fiber-reinforced material.

Depending on the available space or as a function of other marginal conditions, a separate transverse leaf spring may be assigned to each wheel of an axle according to the invention, which transverse leaf spring may then also be oriented particularly in a sloped manner with respect to the transverse direction proportionally in the longitudinal direction of the vehicle. However, as an alternative, a joint single leaf spring element may be provided for the two wheels of the axle. In the latter case, the support of the joint leaf spring element with respect to the vehicle body may be constructed such that this leaf spring element at least proportionally takes over the function of a stabilizer, which is basically known; compare, for example, the above-mentioned German Patent Document DE 29 27 486.

If the suspension strut, which, in the top view, is fastened in front of the drive shaft of the wheel at the wheel carrier/pivot bearing, viewed in the transverse direction of the vehicle, starting from the wheel carrier, is sloped toward the rear and, as customary, is in addition sloped toward the interior, by means of the functionally predefined length of the suspension strut or of the shock absorber of the suspension strut, as a result of this quasi double sloping, a further reduction of the required overall height can be achieved. This is also indicated in an embodiment of the present invention which will be described in the following.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
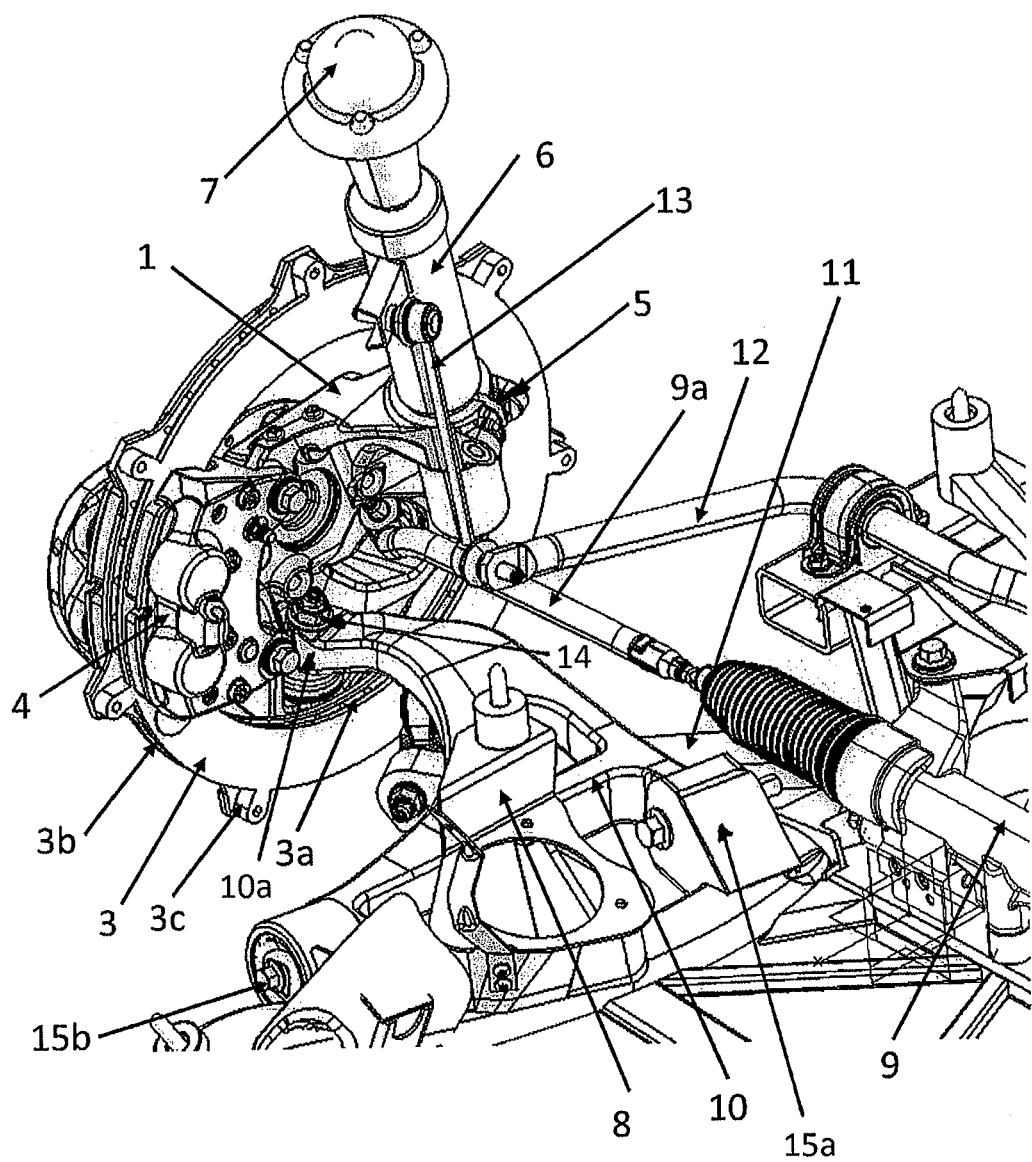
FIG. 1 is an isometric representation showing the left portion of a front axle of a passenger car according to an embodiment of the invention with additional elements shown only partially in fragments.

Reference number 1 indicates a pivot bearing (or wheel carrier), which has a hub la to which a wheel, that is not shown, is fastened or can be fastened. The wheel center plane, which is perpendicular to the axis of rotation 2a of the wheel and contains the center with respect to the width of the wheel tire, has the reference 2 (and can naturally only be shown in FIGS. 2 and 4). A brake disk 3 constructed as a ring is non-rotatably connected with the above-mentioned wheel and therefore rotates about the same axis of rotation 2a. The brake disk 3 is fastened along its outer edge area 3b or along lugs provided at this edge area 3b at the wheel, at the wheel's rim, or at the edge of the so-called wheel nave. In a manner known per se, a caliper 4 interacts with this brake disk 3, which caliper 4 is fastened to the pivot bearing and reaches from the interior, i.e. in the area of its radially interior edge 3a, around the ring-shaped brake disk 3.

On the side of the pivot bearing 1 that faces the vehicle center plane 16 extending in the longitudinal direction of the vehicle as well as in the vertical direction, a press fit or clamping ring 5 is provided by way of which a shock absorber 6 or vibration absorber 6 is fastened in the conventional manner at the pivot bearing 1. The shock absorber 6 or vibration absorber 6 forms a so-called suspension strut (for which reference number 6 is also used). In a conventional manner, this suspension strut 6 is supported and fastened with its end facing away from the pivot bearing 1 by way of a so-called support bearing 7 at the not illustrated body of the vehicle or passenger car.

An axle support 8, on which the components of the front axle are preassembled, is also fastened in a known manner to the vehicle body; or more precisely, the front section of the vehicle body is supported on an axle support 8. For example, a steering gear with a tie rod 9a branching off the steering gear is included in such preassembled components. However, in particular, these preassembled components include a control arm 10 for the pivot bearing 1 as well as—at least in the case of the present embodiment—a supporting spring 11. By way of the supporting spring 11, the vehicle body is supported indirectly, specifically with the interposition of the axle support 8 and, in the present case—as will be explained below— with the further interposition of the above-mentioned control arm 10, proportionally on the pivot bearing 1 and thereby on the wheel, which is supported by the pivot bearing 1 and is not shown.

In the present embodiment, the pivot bearing 1 is guided with respect to the vehicle body by way of the suspension strut 6, the control arm 10, and the tie rod 9a; the remaining degree of freedom in the vertical direction for the compressing and rebounding motion of the vehicle body with respect to the wheel is defined by way of the supporting spring 11, which itself takes over no further guiding function. In the present case, the same applies to the stabilizer 12, which is supported, by way of a hinged support 13, at the suspension strut 6 or at the housing of the shock absorber 6 fixedly connected with the pivot bearing 1.

Figure 4:
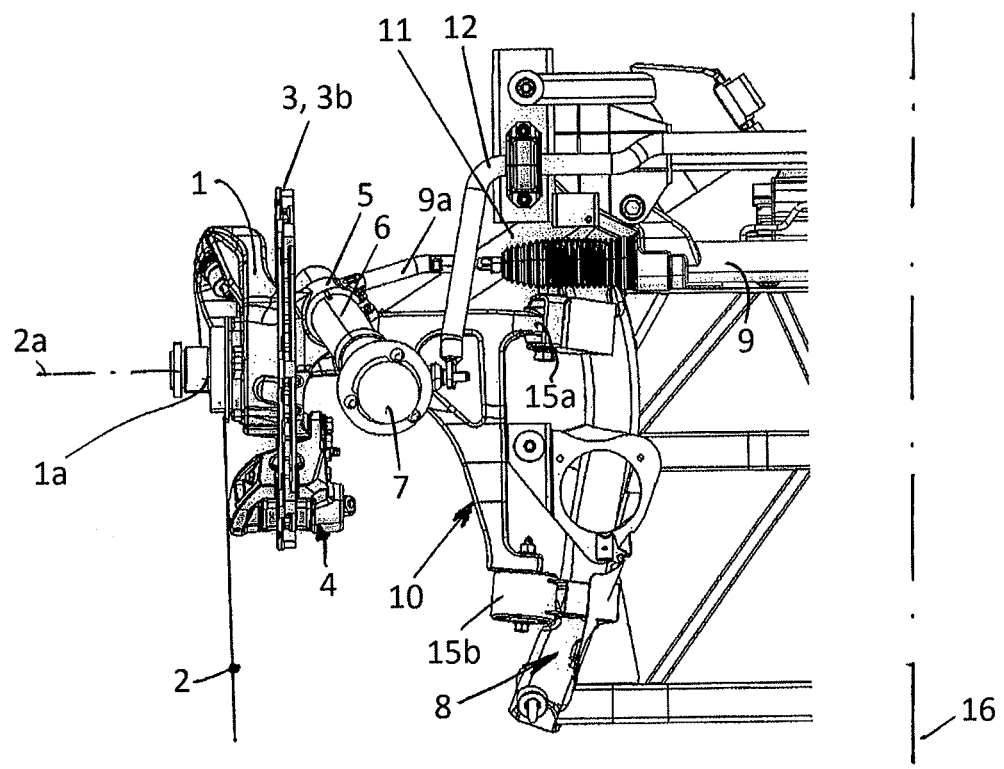
FIG. 4 is a top view.

The above-mentioned control arm 10, which, viewed in the vertical direction (see FIG. 2, for example), is situated far at the bottom, functionally represents an A-arm and, in the present case, has a partially crescent-shaped design, as best illustrated in FIG. 4. With its first end section 10a, this control arm 10 is connected by way of a so-called supporting joint 14 in the form of a ball joint with the pivot bearing 1, while the other end section as well as a center section of this control arm 10 is linked in a manner known to a person skilled in the art by way of bearing positions 15a, 15b to the axle support 8. The bearing positions 15a, 5c define an essentially horizontal swivel axis for the control arm 10, which swivel axis extends in the longitudinal direction of the vehicle.

In the present case, the position of the supporting joint 14 relative to the wheel (not shown) or to the wheel center plane 2 and to the brake disk 3 is significant. As basically known, this supporting joint 14 should in any case, on a suspension strut axle, be situated at least almost in the wheel center plane 2 (or, viewed in the transverse direction of the vehicle, at most at a slight distance from the wheel center plane) and, in this case, as deep as possible inside the so-called wheel nave. The wheel nave, which, like the wheel, is not shown, viewed in the radial direction starting from the axis of rotation 2a of the wheel, is defined by the exterior edge 3b of the brake disk 3; i.e. the wall of the wheel nave, which stands perpendicular on the floor of the wheel nave situated in a plane parallel with respect to the wheel center plane 2, viewed in the radial direction, is situated at least approximately in the exterior ring edge area 3b of the brake disk 3.

Figure 2:
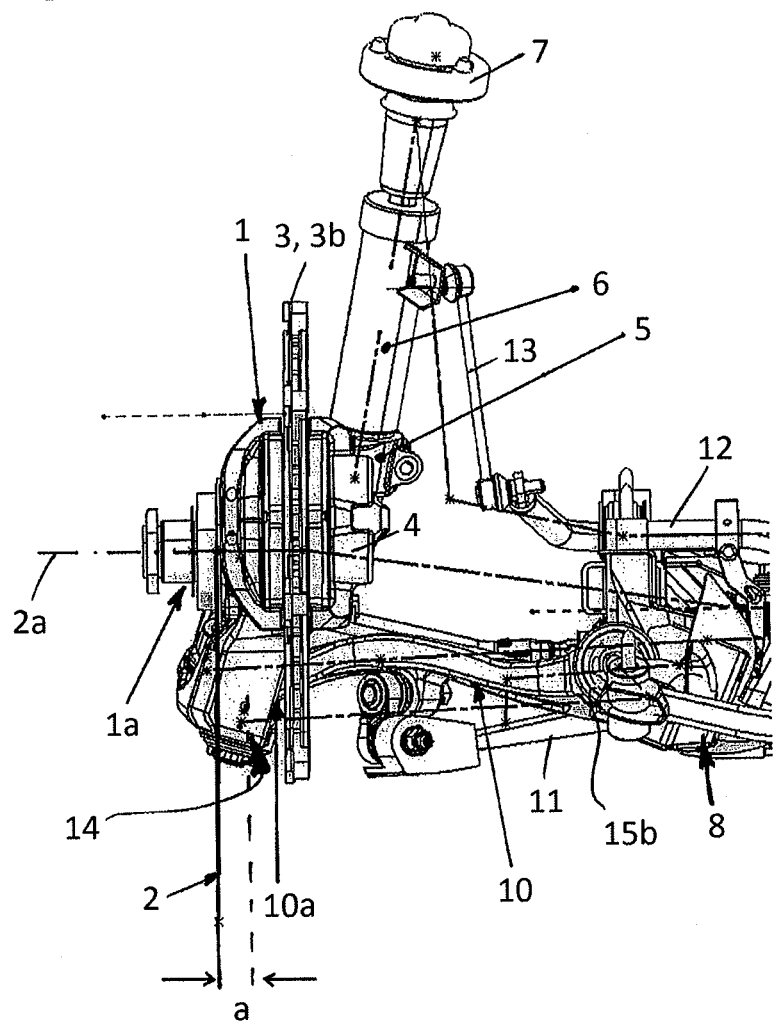
FIG. 2 is a longitudinal view (viewed in the driving direction)
Figure 3:
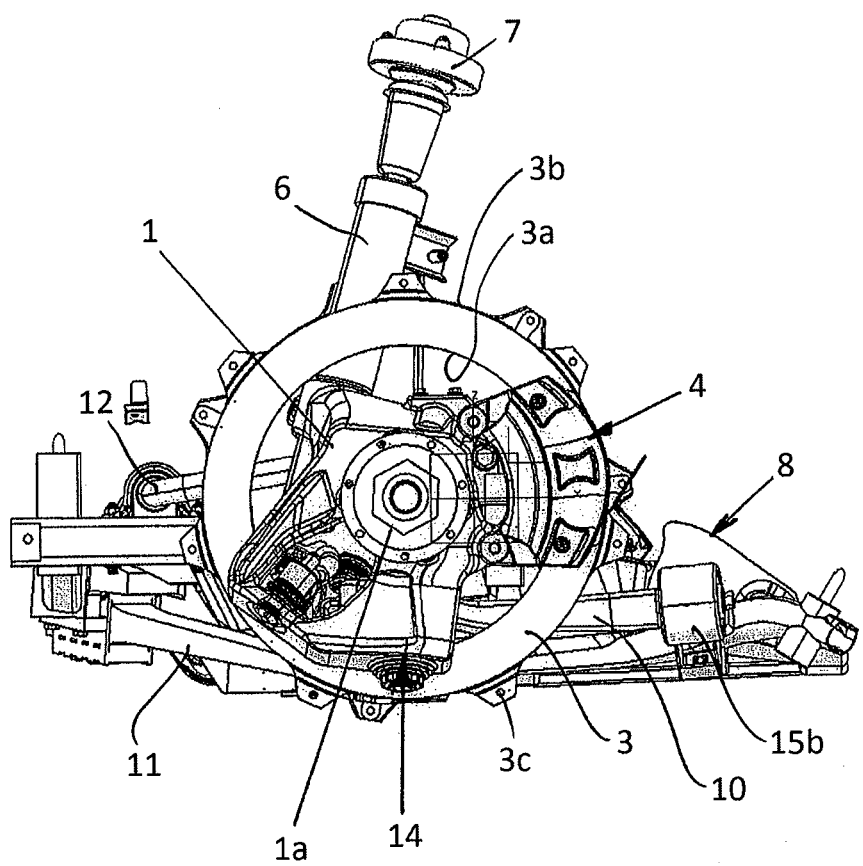
FIG. 3 is a lateral view (in the transverse direction of the vehicle)

This desired position of the supporting joint 14 can now be illustrated particularly well in that the control arm 10 with its section 10a or end area 10a connected by way of this supporting joint 14 with the pivot bearing 1 is guided through the brake disk 2, so that, in the lateral view according to FIG. 3, this section 10a of the control arm 10 is surrounded by the brake disk 3. Viewed from the vehicle center plane 16, the brake disk 3 is therefore situated inside the supporting joint 14 of the pivot bearing 1, or the supporting joint 14 is situated on the side of the brake disk 3 facing away from the vehicle center plane 16, as illustrated particularly well in FIGS. 2-4. The distance "a" measured in the transverse direction of the vehicle between the supporting joint 14 (or its center) and the wheel center plane 2 (see FIG. 2), within which tire contact forces essentially have an effect, can therefore be kept minimal, for example, in the order of magnitude of 20 mm, whereby interfering bending moments onto the suspension strut 6 resulting from the tire contact forces are minimized.

As particularly well illustrated in FIGS. 2 and 3, the supporting joint 14 is additionally placed essentially at the lowest point of the wheel nave or, viewed in the vertical direction, in the lowest area of the brake disk 3, whereby a slightly negative steering offset can be implemented. The inclination of the suspension strut 6 illustrated in FIG. 2 also promotes the slightly negative steering offset, which suspension strut 6, in addition, as shown in FIG. 3, is sloped toward the rear starting from the pivot bearing 1. This inclination also makes it possible to fasten the suspension strut 6, viewed in the top view, in front of a drive shaft of the wheel, not shown here in a figure but situated essentially in the axis of rotation 2a of the wheel, at the pivot bearing 1 and thereby, viewed in the vertical direction, in a relatively low position. Together with the two angles of slope of the suspension strut 6, viewed in the vertical direction, its support bearing 7 can therefore also be provided in a relatively low position, so that a low-lying front hood contour of the vehicle body becomes possible.

The supporting spring 11 is constructed as a leaf spring element (also reference number 11), which is at least partially oriented in the transverse direction of the vehicle; in the present case, at an angle of approximately 30° in the driving direction toward the front. This leaf spring element 11 is supported on one side at the control arm 10 as close as possible to the pivot bearing 1; however, preferably in the present case, because of a lack of remaining space inside the brake disk, it is supported on the side of the brake disk 3 facing the vehicle center plane 16; and, on the other side, at a suitable point at the axle support 8. Naturally, an arrangement deviating from the previous arrangement is also contemplated, in addition to the fact that a plurality of details, particularly of the constructive type, may be designed to deviate from the above explanations without departing from the spirit of the invention.

Compared to a spring strut axle, it is possible, by means of the suspension strut axle according to the invention, to implement a position of the support bearing 7 that is lower viewed in the vertical direction and thereby obtain a lower surface contour of the vehicle body in this area without greater expenditures while maintaining comparable functionality. Compared with a twin control arm axle, a suspension strut axle is also distinguished by low overall height, particularly, however, because of a non-existing upper control arm plane, by reduced construction expenditures and a reduced weight. The support bearing is also subjected to a significantly lower load as a result of the conceivably higher suspension strut ratio and the elimination of the supporting spring force. Consequently, smaller-dimensioned material cross-sections in the vehicle body in the area of the support bearing 7 also become possible. Because of less track change above the steering angle, the single-pivot principle used in the case of a single-pivot type suspension strut axle requires advantageously lower steering performances. A comparatively considerably more expensive so-called double-pivot solution, for example, analogous to the above-mentioned European Patent Application EP 0 402 777 which, in principle, had to be created only because of the space conflict between the brake disk 3 and the supporting joint 14, will no longer be necessary as a result of the present invention, specifically because of the fact that the control arm 10 is guided with its section 10a connected with the supporting joint 14 through the ring-shaped and internally encompassed brake disk 3.

LIST OF REFERENCE NUMBERS

1 Pivot bearing (wheel carrier)
1a Hub
2 Wheel center plane
2a Axis of rotation of wheel
3 Brake disk
3a Interior edge of brake disk 3=interior ring edge area
3b Exterior edge of brake disk 3=exterior ring edge area
3c Lugs (on 3b)
4 Caliper
5 Clamping ring, press fit
6 Shock absorber or vibration absorber or suspension strut
7 Support bearing
8 Axle support
9 Steering gear
9a Tie rod
10 Control arm
10a End section of 10, which is connected with 1 or 14
11 Supporting spring=leaf spring element
12 Stabilizer
13 Hinged support for the stabilizer
14 Supporting joint (between 1 and 10)
15a Bearing position (of 10 on 8)
15b Bearing position (of 10 on 8)
16 Vehicle center plane
a Distance between 2 and 14 measured in the transverse direction of the vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A single-pivot suspension strut axle for a motor vehicle, comprising:
   a ring-shaped brake disk having a radially interior edge and a radially exterior edge, an inboard side face and an outboard side face;
   one of a wheel carrier and a pivot bearing operatively configured to carry a wheel and the brake disk, the brake disk being non-rotatably connected to the wheel with respect to a rotational axis of the wheel;
   a suspension strut fastened to the wheel carrier or pivot bearing at one end, and supported at a vehicle body at another end;
   a lower control arm being operatively configured to guide the wheel carrier or pivot bearing via a supporting joint situated close to a wheel center plane;

a tie rod operatively configured to also guide the wheel carrier or pivot bearing; and wherein a section of the lower control arm that connects with the supporting joint extends through the ring-shaped brake disk, and the supporting joint is positioned closer to the outboard side face of the brake disk than to the inboard side face.

2. The single pivot suspension strut axle according to claim 1, wherein:

the suspension strut is fastened at the one end to the wheel carrier or pivot bearing in front of a drive shaft of the wheel relative to a driving direction in a top view; and the suspension strut is operatively arranged to slope from the wheel carrier or pivot bearing toward a rear of the vehicle and additionally toward a vehicle center plane.

3. The single pivot suspension strut axle according to claim 1, further comprising:

a leaf spring element operatively configured for proportional support of the vehicle body on the wheel, the leaf spring element being oriented at least partially in a transverse direction of the vehicle and being supported on one end side at the lower control arm and on another end side, directly or indirectly by interposition of an axle support, at the vehicle body.

4. The single pivot suspension strut axle according to claim 3, wherein:

the suspension strut is fastened at the one end to the wheel carrier or pivot bearing in front of a drive shaft of the wheel relative to a driving direction in a top view; and the suspension strut is operatively arranged to slope from the wheel carrier or pivot bearing toward a rear of the vehicle and additionally toward a vehicle center plane.

5. The single pivot suspension strut axle according to claim 3, wherein for two wheels of the strut axle, the leaf spring element is operatively configured as a joint single leaf spring element for the two wheels.

6. The single pivot suspension strut axle according to claim 5, wherein a support for the joint single leaf spring element with respect to the vehicle body is operatively configured such that the joint single leaf spring element operates as an at least proportional stabilizer.

7. The single pivot suspension strut axle according to claim 3, wherein the leaf spring element is composed of a plastic material.

8. The single pivot suspension strut axle according to claim 7, wherein the plastic material is a fiber-reinforced plastic material.

9. The single pivot suspension strut axle according to claim 7, wherein for two wheels of the strut axle, the leaf spring element is operatively configured as a joint single leaf spring element for the two wheels.

10. The single pivot suspension strut axle according to claim 3, wherein the leaf spring element is hinged to the lower control arm at the one end side and, at the other end side, is fixedly supported at the vehicle body with respect to moments.

11. The single pivot suspension strut axle according to claim 10, wherein:

the suspension strut is fastened at the one end to the wheel carrier or pivot bearing in front of a drive shaft of the wheel relative to a driving direction in a top view; and the suspension strut is operatively arranged to slope from the wheel carrier or pivot bearing toward a rear of the vehicle and additionally toward a vehicle center plane.

12. The single pivot suspension strut axle according to claim 10, wherein for two wheels of the strut axle, the leaf spring element is operatively configured as a joint single leaf spring element for the two wheels.

13. The single pivot suspension strut axle according to claim 12, wherein a support for the joint single leaf spring element with respect to the vehicle body is operatively configured such that the joint single leaf spring element operates as an at least proportional stabilizer.

14. The single pivot suspension strut axle according to claim 10, wherein the leaf spring element is composed of a plastic material.

15. The single pivot suspension strut axle according to claim 14, wherein the plastic material is a fiber-reinforced plastic material.

16. The single pivot suspension strut axle according to claim 14, wherein for two wheels of the strut axle, the leaf spring element is operatively configured as a joint single leaf spring element for the two wheels.

* * * * *